United States Patent
Shinzato

(10) Patent No.: US 11,493,730 B2
(45) Date of Patent: Nov. 8, 2022

(54) OPTICAL SYSTEM AND OPTICAL APPARATUS

(71) Applicant: CANON KABUSHIKI KAISHA, Tokyo (JP)

(72) Inventor: Yuki Shinzato, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 155 days.

(21) Appl. No.: 16/928,291

(22) Filed: Jul. 14, 2020

(65) Prior Publication Data

US 2021/0018721 A1   Jan. 21, 2021

(30) Foreign Application Priority Data

Jul. 18, 2019 (JP) .............................. JP2019-132360

(51) Int. Cl.
| | | |
|---|---|---|
| *G02B 15/14* | (2006.01) | |
| *G02B 9/34* | (2006.01) | |
| *G02B 7/04* | (2021.01) | |

(52) U.S. Cl.
CPC ............. *G02B 9/34* (2013.01); *G02B 7/04* (2013.01); *G02B 15/144* (2019.08)

(58) Field of Classification Search
CPC .............. G02B 9/34; G02B 15/144; G02B 15/144103; G02B 15/144111; G02B 15/144503; G02B 15/144511
See application file for complete search history.

(56) References Cited

U.S. PATENT DOCUMENTS

| | | | |
|---|---|---|---|
| 9,250,427 B2 | 2/2016 | Nagahara | |
| 10,018,811 B2 | 7/2018 | Saito | |
| 2017/0108673 A1 | 4/2017 | Ichikawa | |
| 2020/0026060 A1* | 1/2020 | Takato | ........... G02B 15/144105 |

FOREIGN PATENT DOCUMENTS

| | | |
|---|---|---|
| CN | 104145200 A | 11/2014 |
| CN | 105093505 A | 11/2015 |
| JP | 2010085934 A | 4/2010 |
| JP | 2013246381 A | 12/2013 |
| JP | 5443912 B2 | 3/2014 |
| JP | 2014235217 A | 12/2014 |
| JP | 5830360 B2 | 12/2015 |
| JP | 2016180851 A | 10/2016 |
| JP | 2018205527 A | 12/2018 |
| JP | 6501984 B2 | 4/2019 |

OTHER PUBLICATIONS

Extended European Search Report issued in European Appln. No. 20186389.1 dated Dec. 9, 2020.
Office Action issued in Chinese Appln. No. 202010692311.4 dated Jan. 27, 2022. English translation provided.

* cited by examiner

*Primary Examiner* — Joseph P Martinez
(74) *Attorney, Agent, or Firm* — Rossi, Kimms & McDowell LLP

(57) ABSTRACT

An optical system includes, in order from an object side to an image side, a first lens unit fixed during focusing, a second lens unit having a positive refractive power, configured to move during focusing, a third lens unit having a negative refractive power, configured to move during focusing, and a fourth lens unit fixed during focusing. During focusing from infinity to a short distance end, the second lens unit and the third lens unit move to the object side while a distance between the second lens unit and the third lens unit changes. A predetermined condition is satisfied.

20 Claims, 13 Drawing Sheets

OPTICAL SYSTEM AND OPTICAL APPARATUS

BACKGROUND OF THE INVENTION

Field of the Invention

The present invention relates to an optical system suitable for an optical apparatus including an image pickup apparatus, such as a digital video camera, a digital still camera, a broadcasting camera, a film-based camera, and a surveillance camera, and an interchangeable lens.

Description of the Related Art

Some of the above optical systems adopt a floating focus system that provides focusing by moving a plurality of lens units on different trajectories, as disclosed in Japanese Patent Laid-Open No. ("JP") 2016-180851. Since the optical system disclosed in JP 2016-180851 has a large number of lenses forming one of two focus units, an actuator needs a high output for driving the focus unit by the actuator. JP 2018-205527 discloses an optical system that provides focusing by moving a focus lens, which is a single, lightweight lens.

However, it is difficult to suppress aberrational variations during focusing with the single lens as in the optical system disclosed in JP 2018-205527.

SUMMARY OF THE INVENTION

The present invention provides an optical system that can suppress aberrational variations during focusing with a lightweight focus unit.

An optical system according to one aspect of the present invention includes, in order from an object side to an image side, a first lens unit fixed during focusing, a second lens unit having a positive refractive power, configured to move during focusing, a third lens unit having a negative refractive power, configured to move during focusing, and a fourth lens unit fixed during focusing. During focusing from infinity to a short distance end, the second lens unit and the third lens unit move to the object side while a distance between the second lens unit and the third lens unit changes. The following condition is satisfied:

$$-0.4 < f/f1 < 0.8$$

where f1 is a focal length of the first lens unit, and f is a focal length of the optical system focused on the infinity.

An optical apparatus having the above optical system also constitutes another aspect of the present invention.

Further features of the present invention will become apparent from the following description of exemplary embodiments with reference to the attached drawings.

DESCRIPTION OF THE EMBODIMENTS

Figure 1:
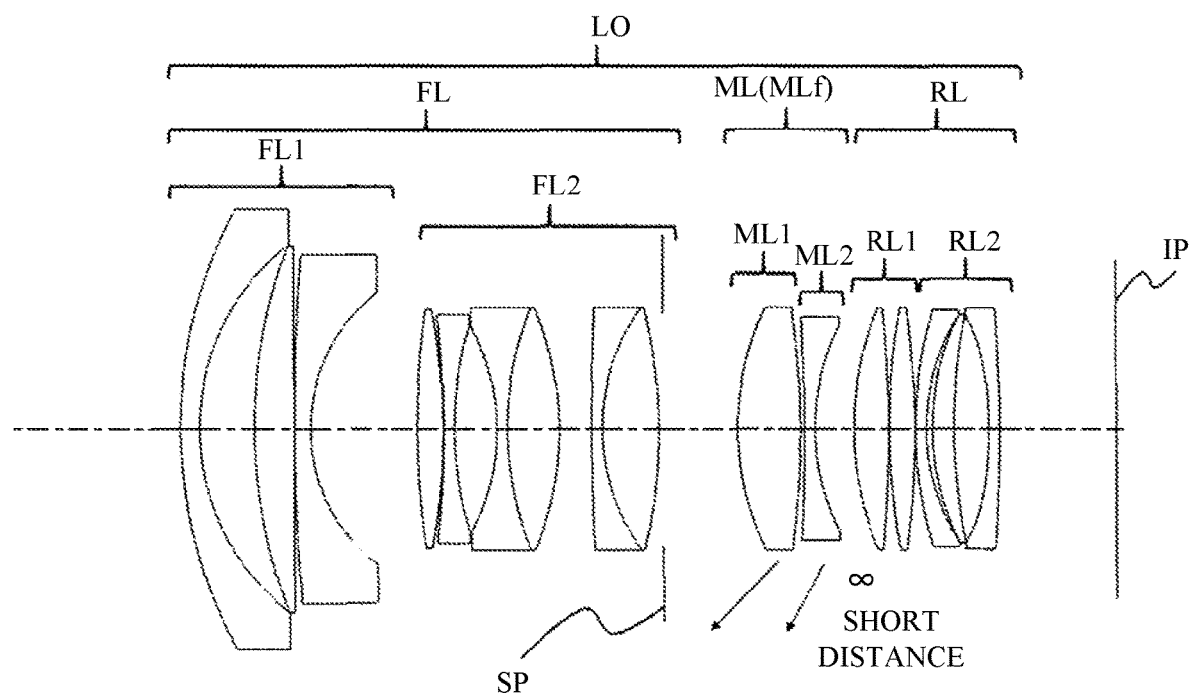
FIG. 1 is a sectional view of an optical system according to Example 1 of the present invention in an in-focus state on infinity.
Figure 2A:
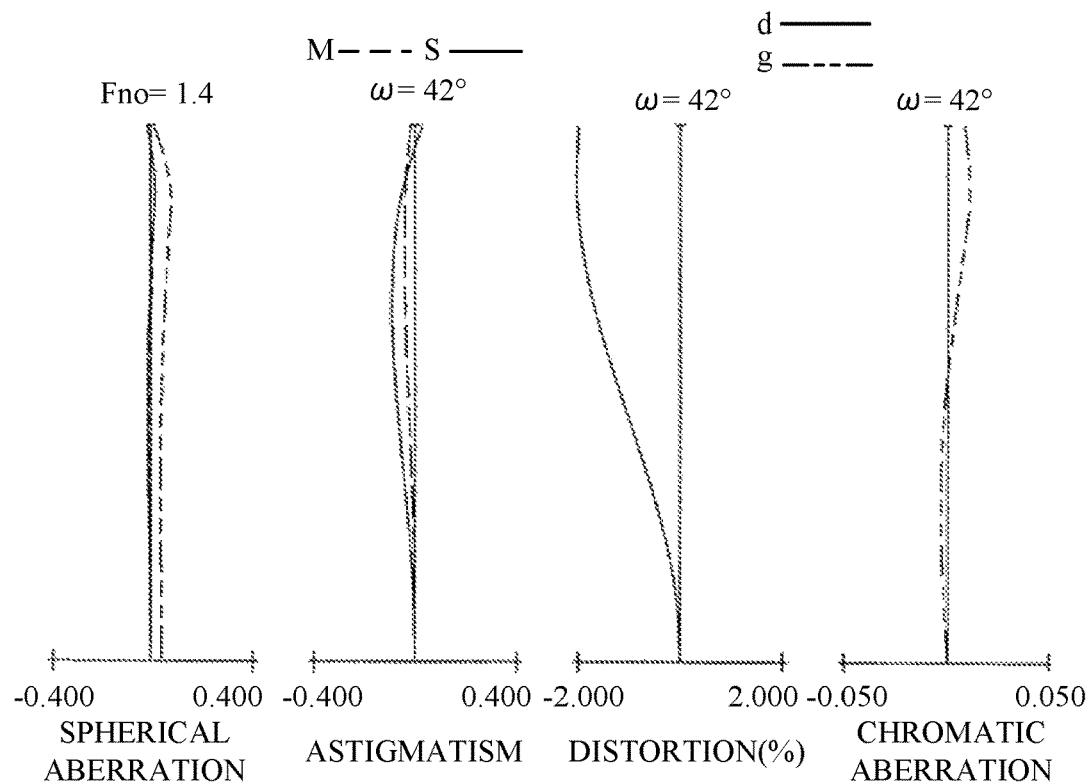
FIGS. 2A and 2B are aberration diagrams of the optical system according to Example 1 in the in-focus state on infinity and in the in-focus state on a short distance end.
Figure 2B:
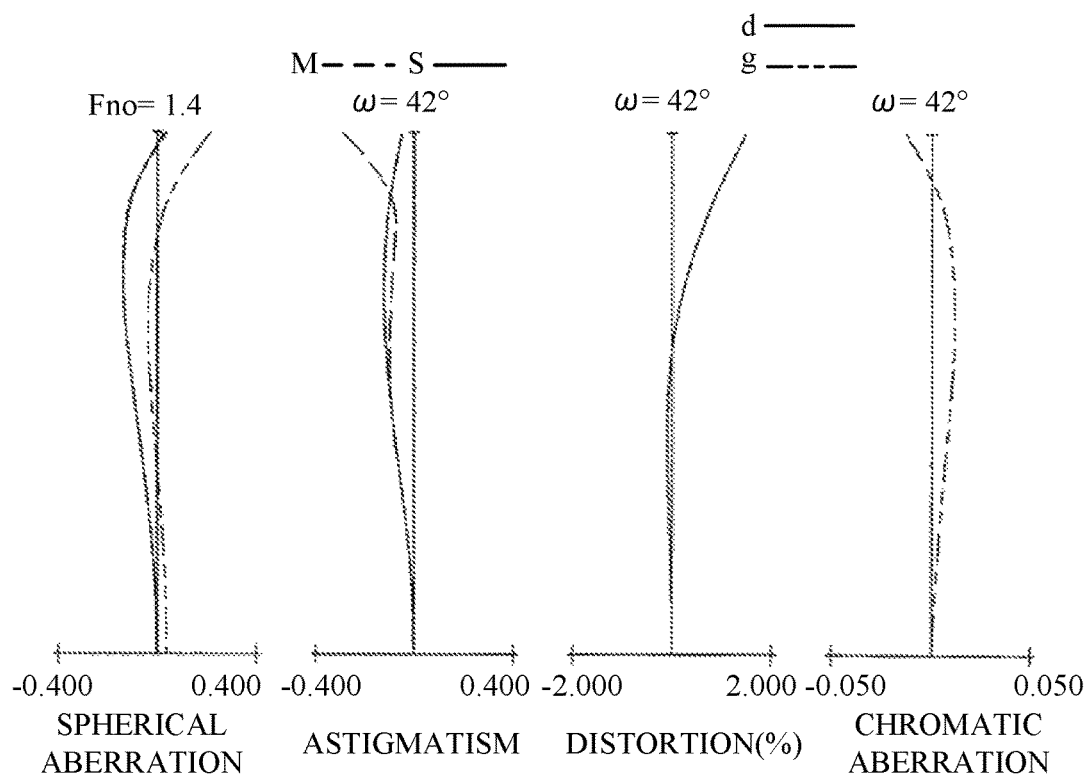
Figure 3:
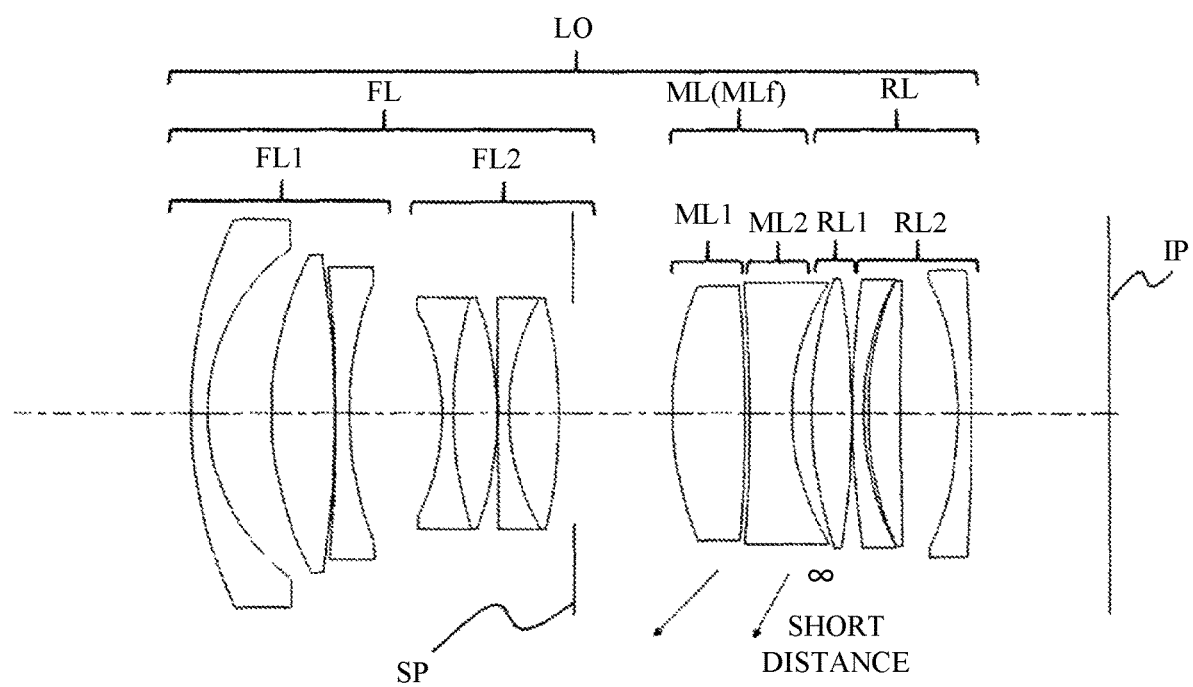
FIG. 3 is a sectional view of an optical system according to Example 2 of the present invention in an in-focus state on infinity.
Figure 4A:
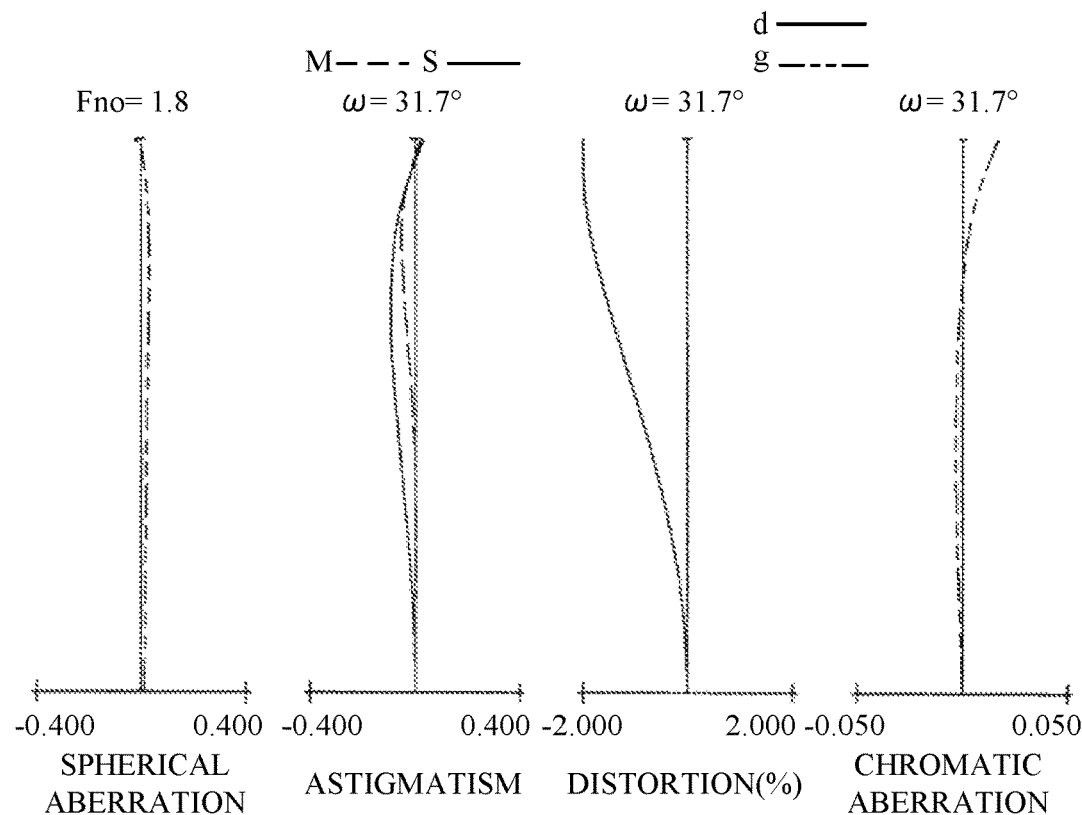
FIGS. 4A and 4B are aberration diagrams of the optical system according to Example 2 in the in-focus state on infinity and in the in-focus state on a short distance end.
Figure 4B:
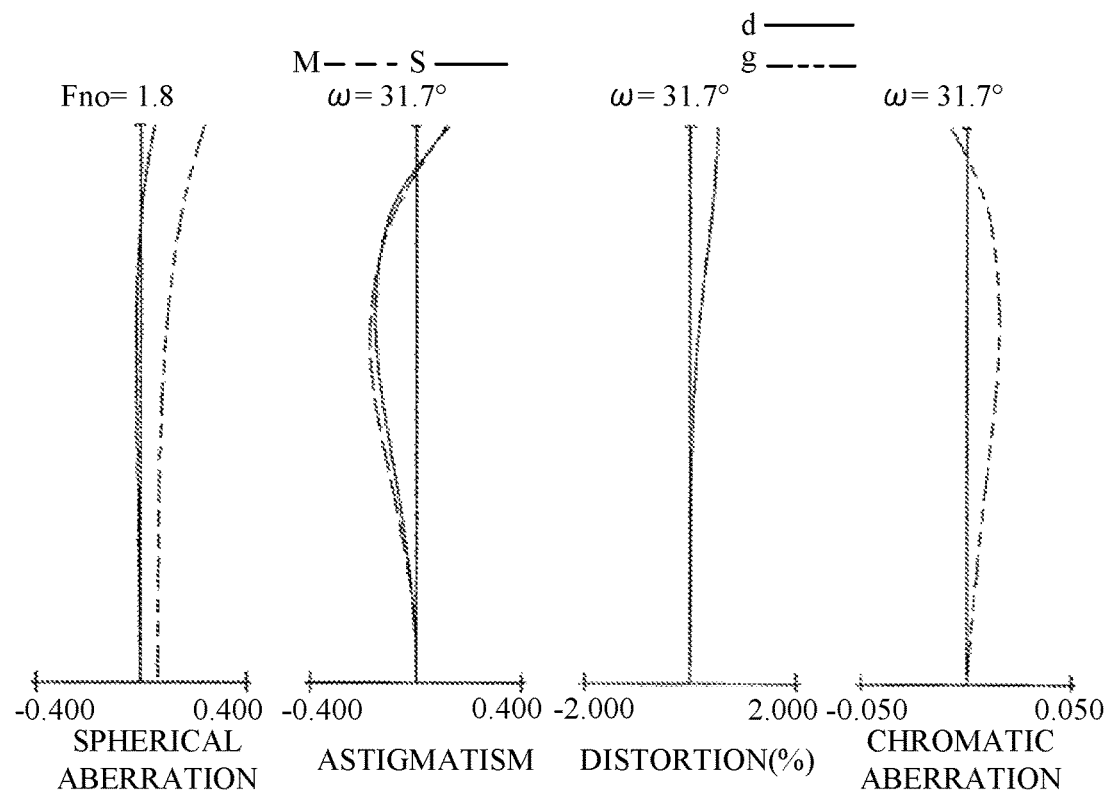
Figure 5:
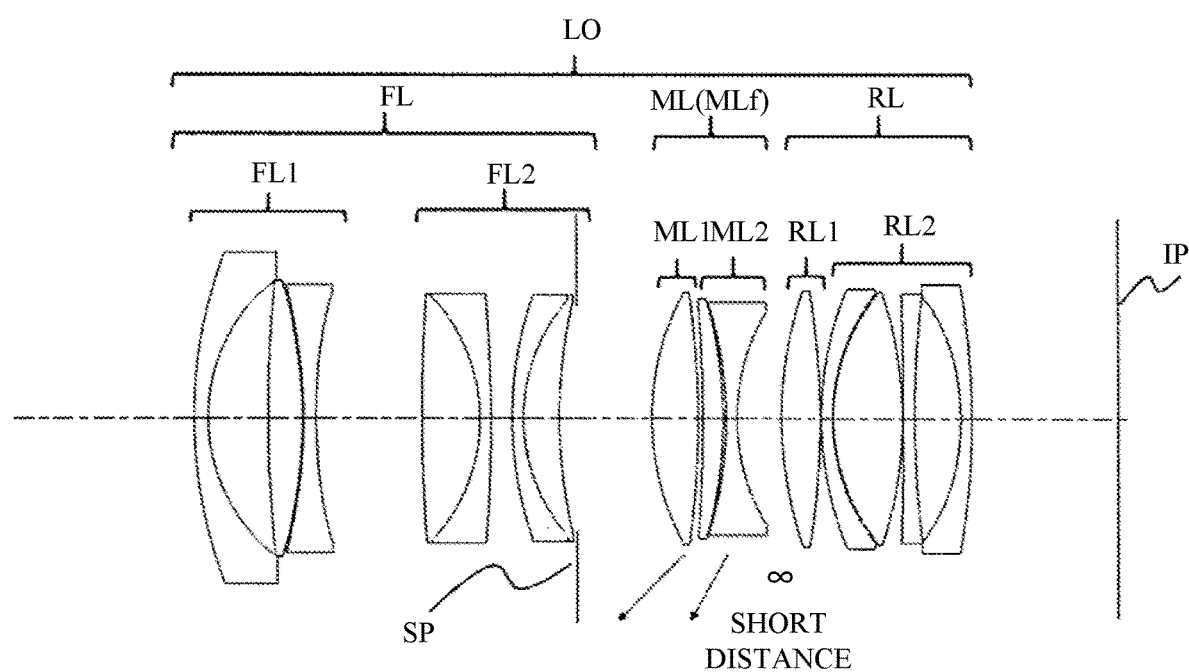
FIG. 5 is a sectional view of an optical system according to Example 3 of the present invention in an in-focus state on infinity.
Figure 6A:
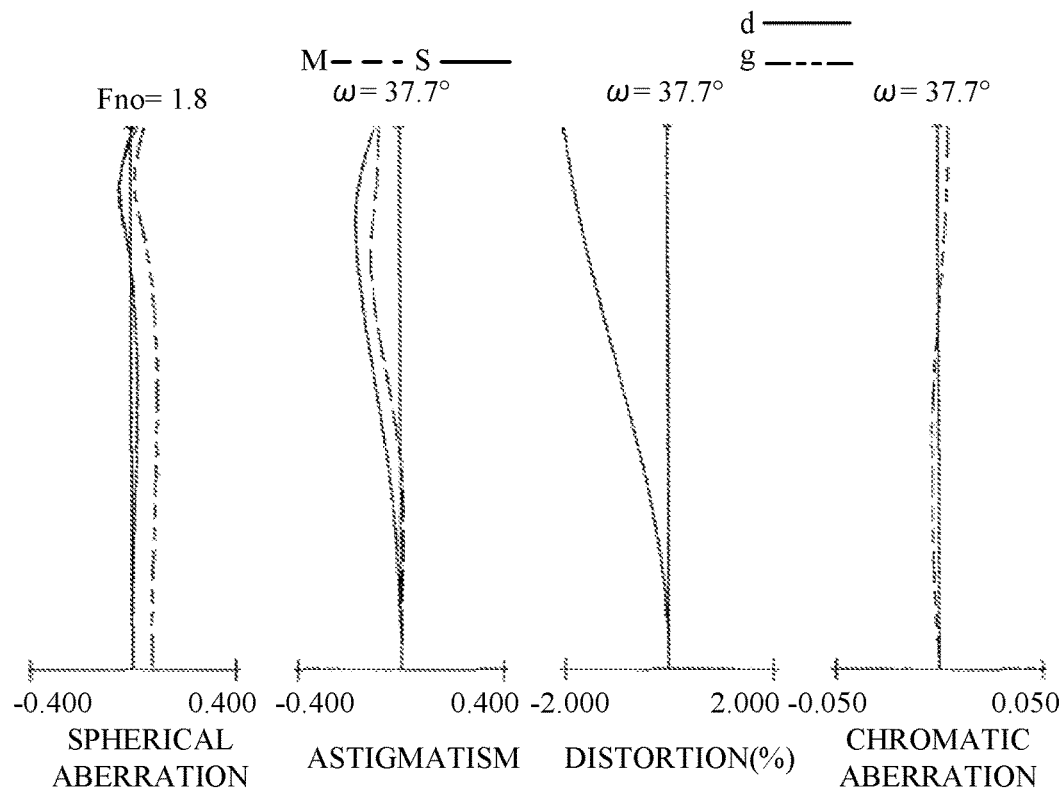
FIGS. 6A and 6B are aberration diagrams of the optical system according to Example 3 in the in-focus state on infinity and in the in-focus state on a short distance end.
Figure 6B:
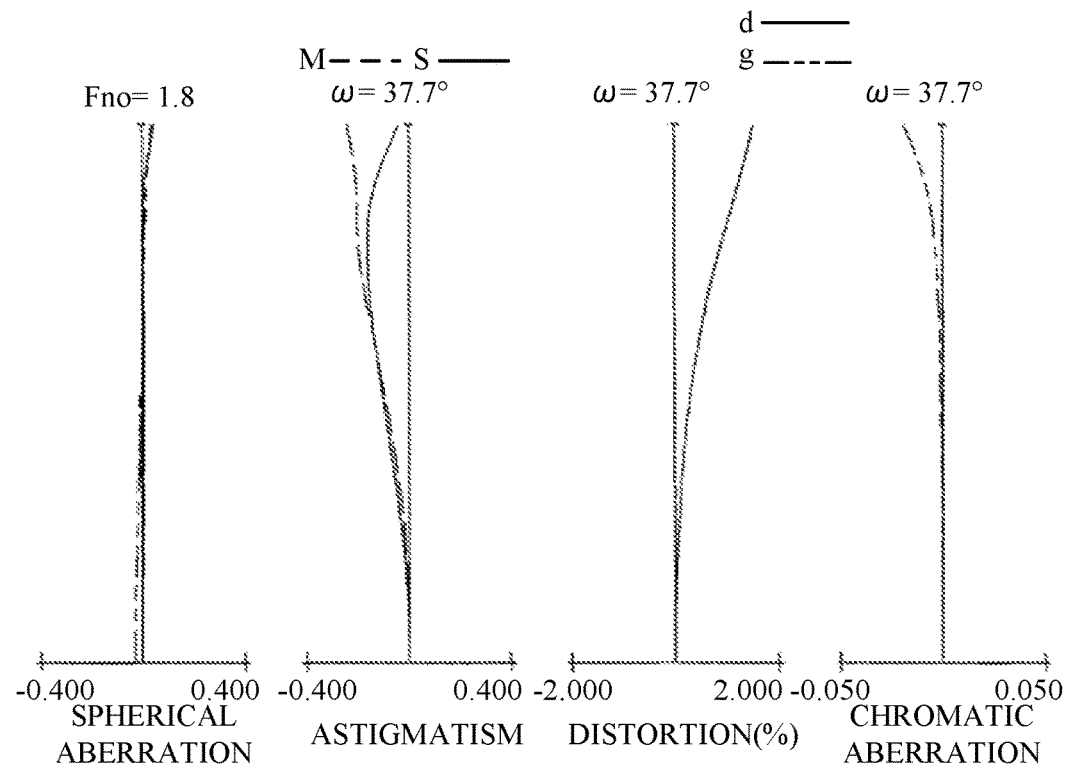
Figure 7:
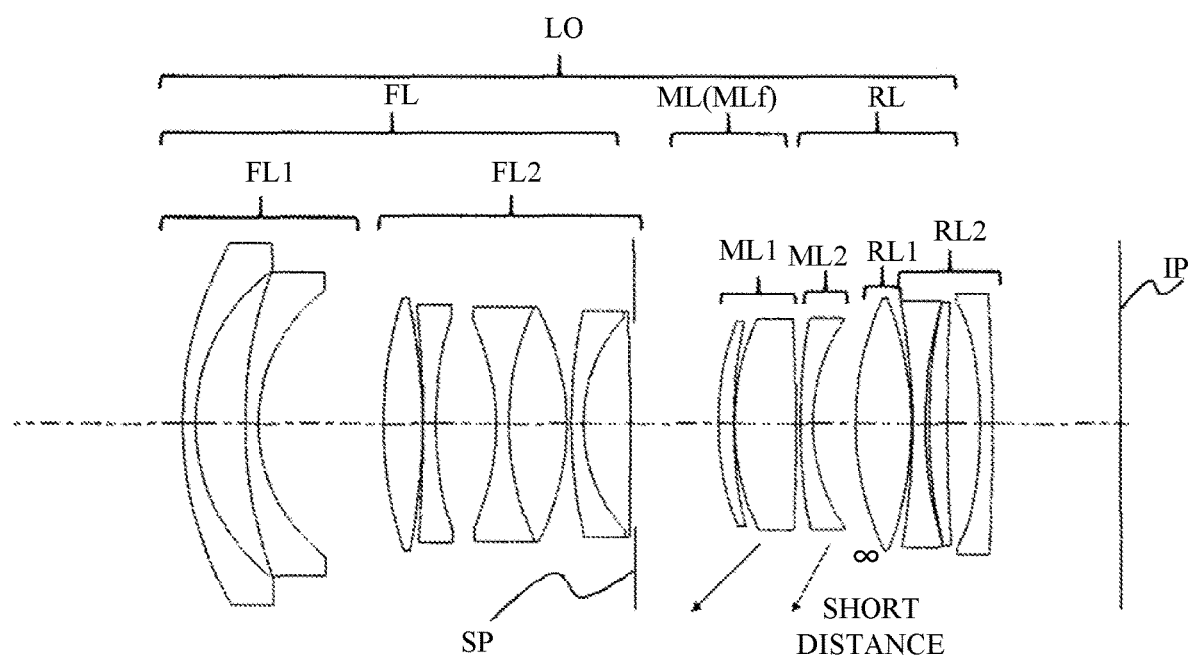
FIG. 7 is a sectional view of an optical system according to Example 4 of the present invention in an in-focus state on infinity.
Figure 8A:
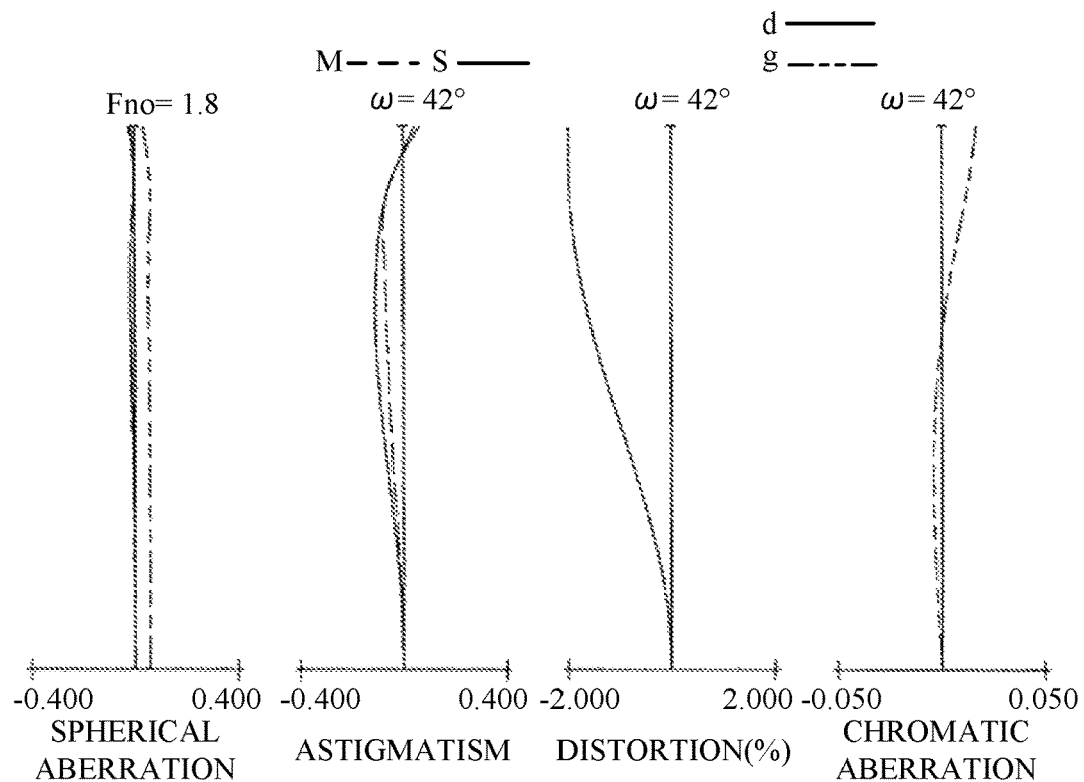
FIGS. 8A and 8B are aberration diagrams of the optical system according to Example 4 in the in-focus state on infinity and in the in-focus state on a short distance end.
Figure 8B:
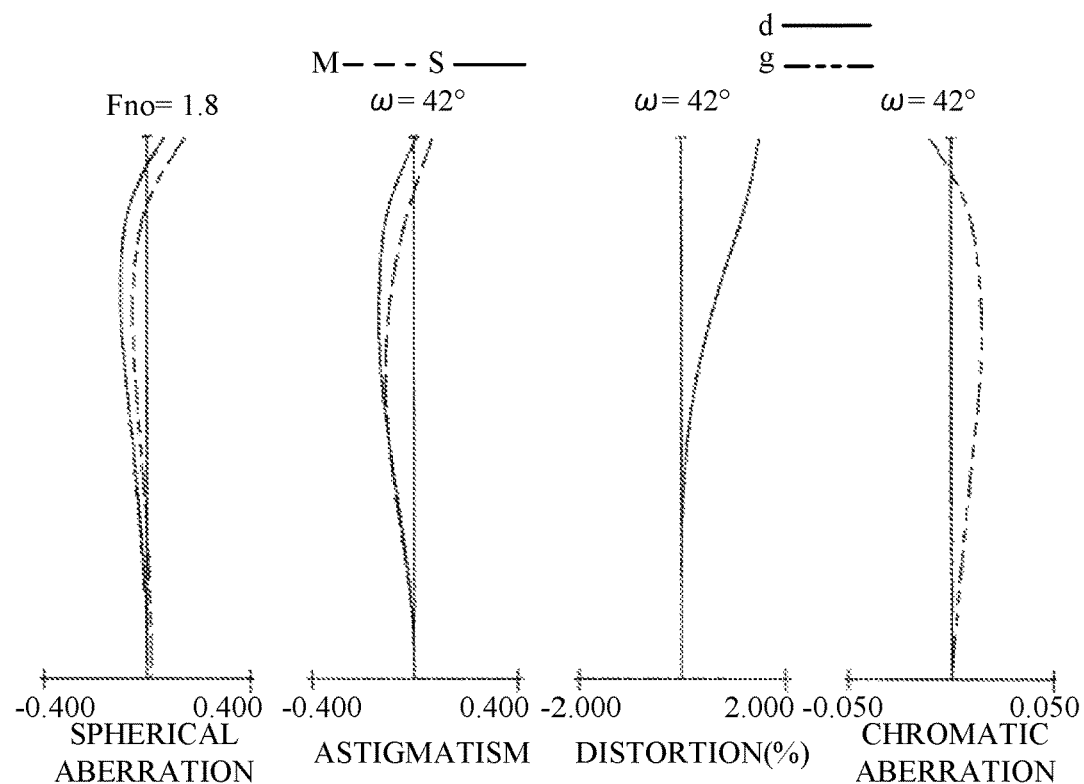
Figure 9:
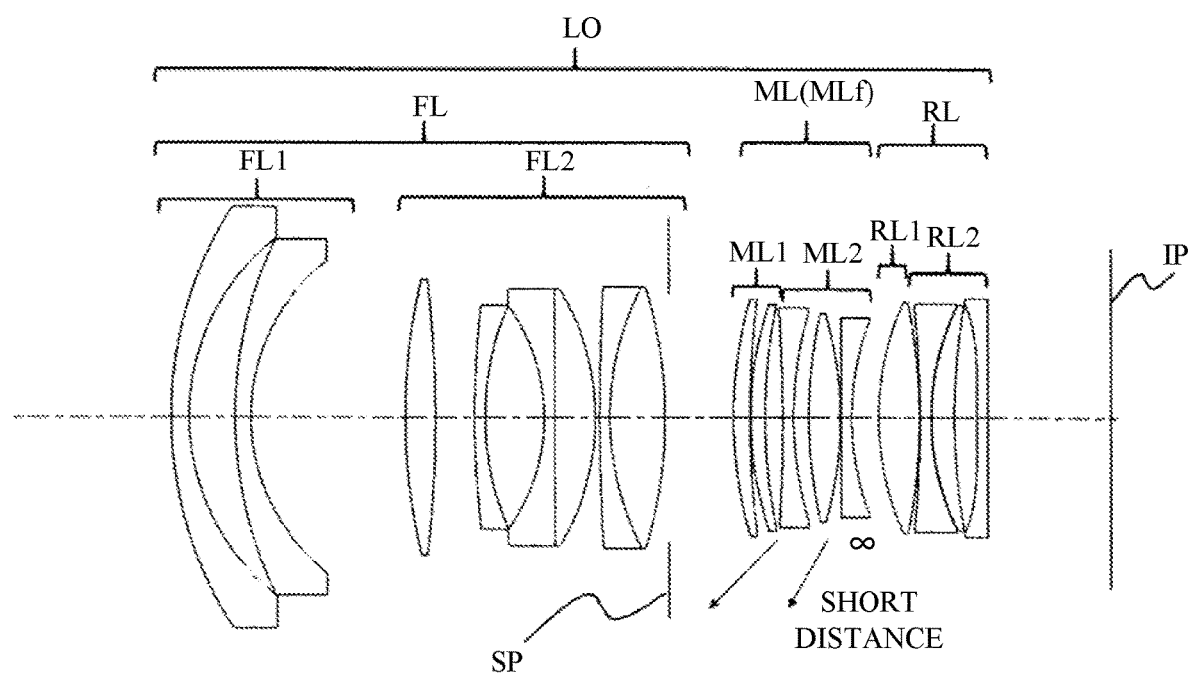
FIG. 9 is a sectional view of an optical system according to Example 5 of the present invention in an in-focus state on infinity.
Figure 10A:
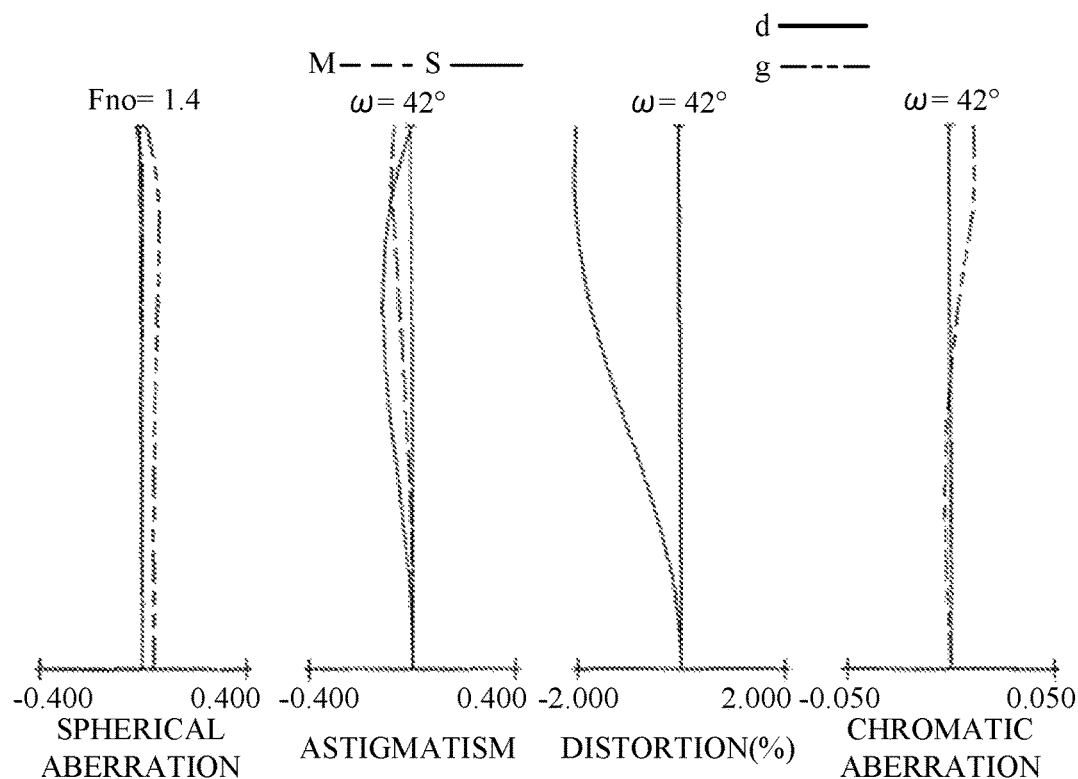
FIGS. 10A and 10B are aberration diagrams of the optical system according to Example 5 in the in-focus state on infinity and in the in-focus state on a short distance end.
Figure 10B:
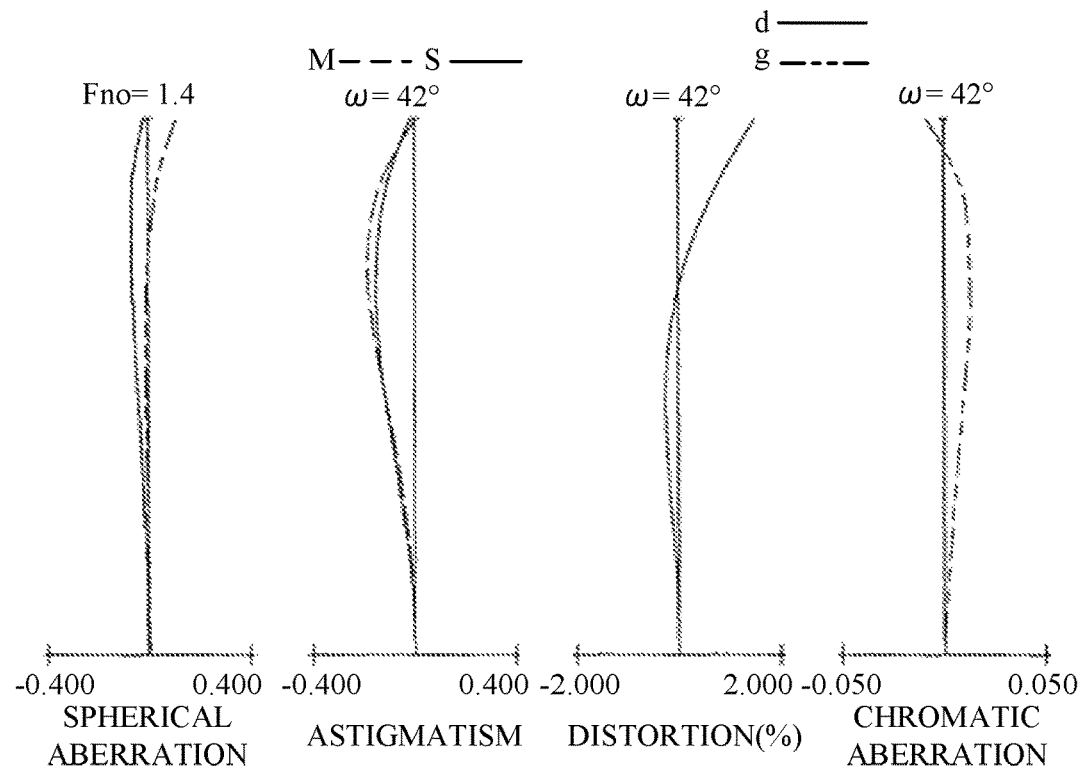
Figure 11:
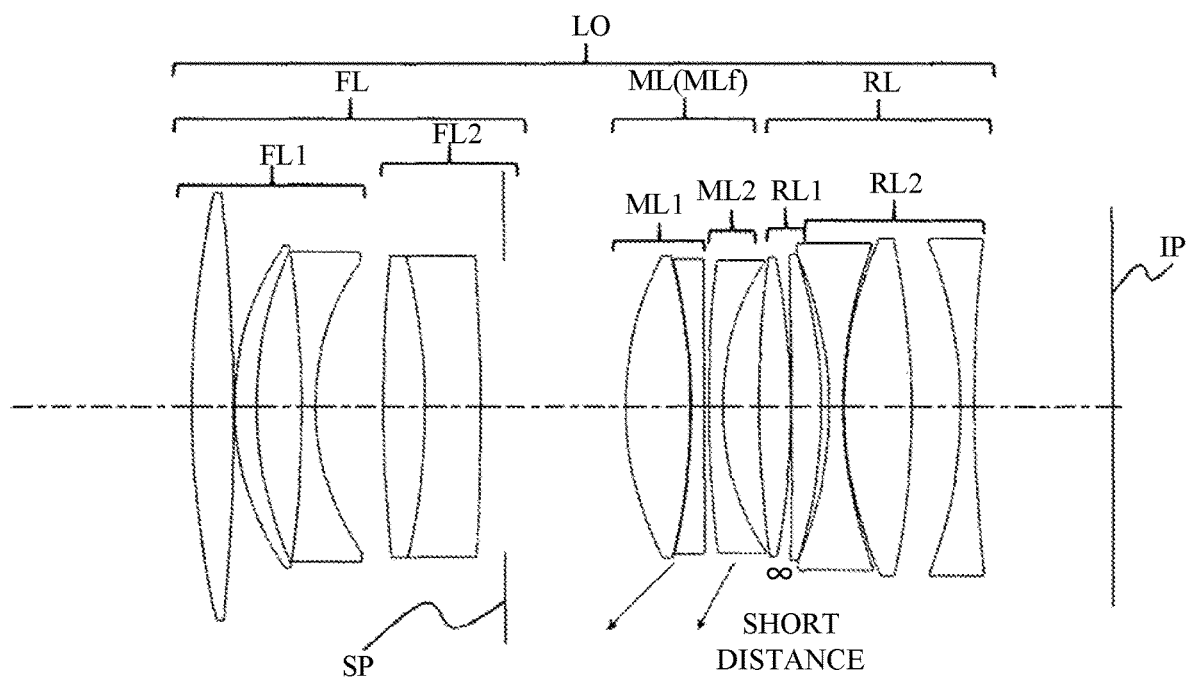
FIG. 11 is a sectional view of an optical system according to Example 6 of the present invention in an in-focus state on infinity.
Figure 12A:
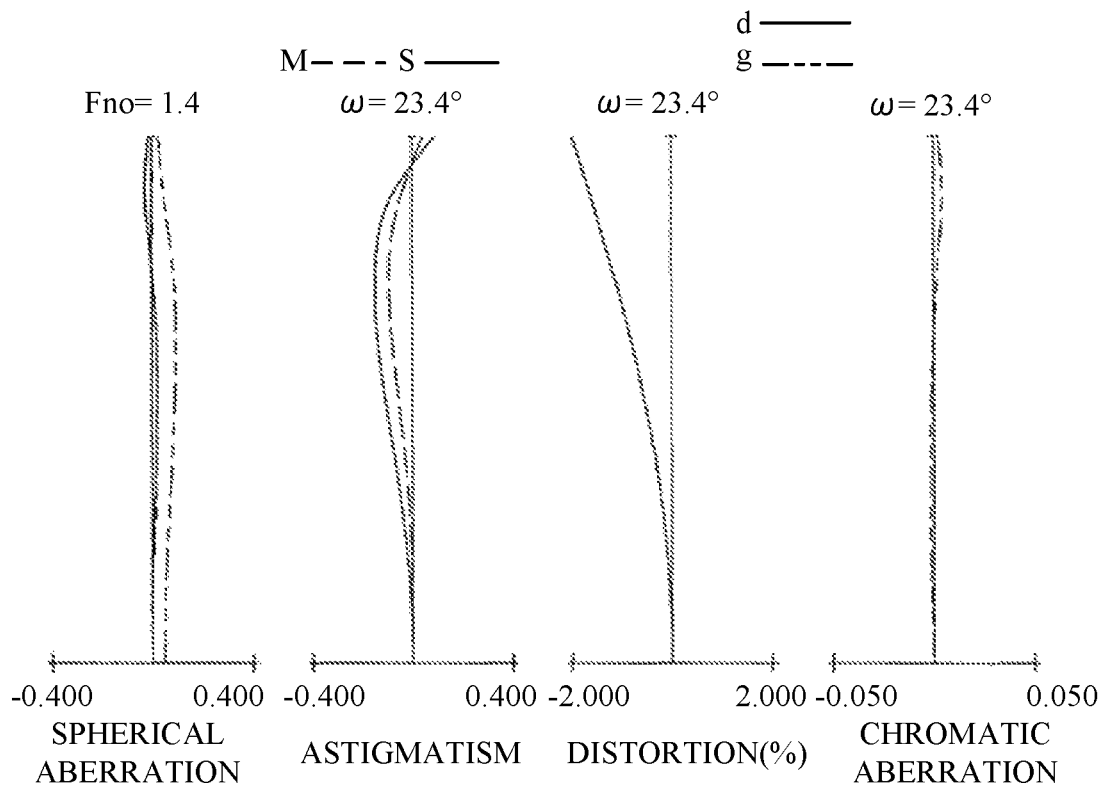
FIGS. 12A and 12B are aberration diagrams of the optical system according to Example 6 in the in-focus state on infinity and in the in-focus state on a short distance end.
Figure 12B:
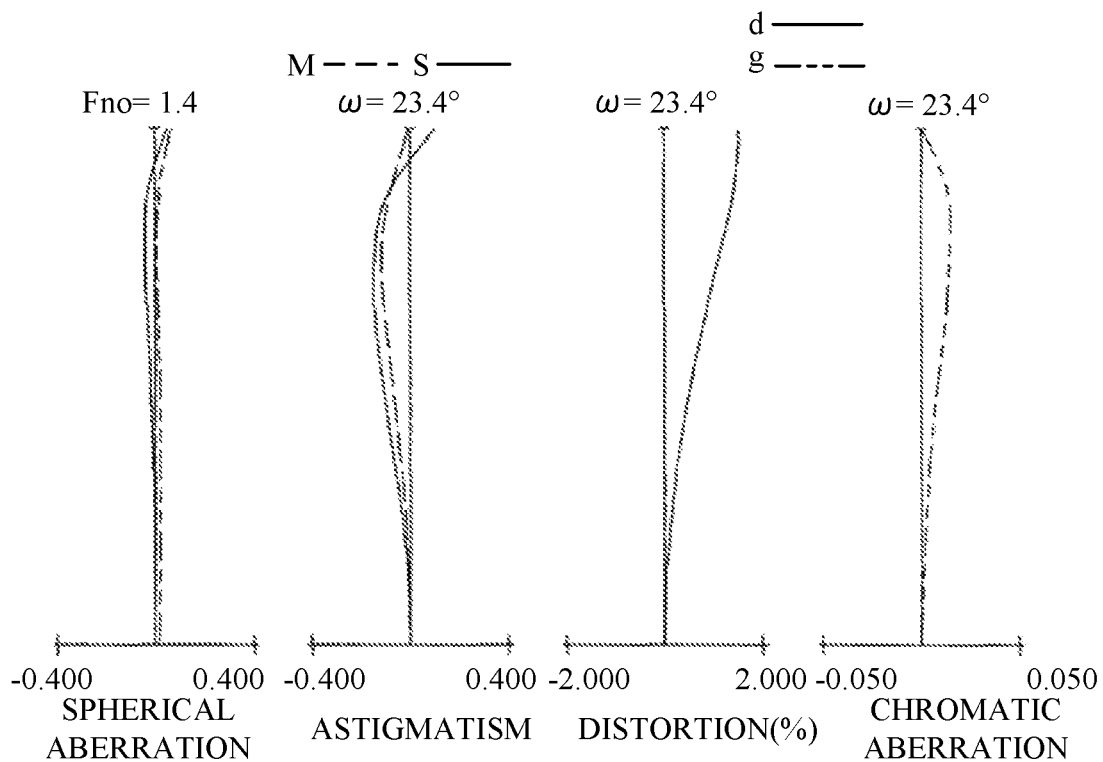

Referring now to the accompanying drawings, a description will be given of embodiments according to the present invention. FIGS. 1, 3, 5, 7, 9, and 11 illustrate sectional views of optical systems Lo according to Examples 1, 2, 3, 4, 5, and 6, respectively, which focus on infinity (in an in-focus state on infinity). The optical system L0 according to each example is used for an optical apparatus including an image pickup apparatus such as a digital video camera, a digital still camera, a broadcasting camera, a film-based camera, and a surveillance camera, and an interchangeable lens.

In each sectional view, the left side is the object side and the right side is the image side. The optical system L0 according to each example includes a plurality of lens units. In each example, the lens unit means a lens group that integrally moves or is fixed during focusing. In the optical system L0 according to each example, a distance between adjacent lens units changes during focusing from infinity (far) to a short distance end (near). The lens unit may include one or more lenses. The lens unit may include an aperture stop.

The optical system L0 according to each example includes, in order from the object side to the image side, a front lens unit FL (FL1, FL2), an intermediate lens unit ML (ML1, ML2), and a rear lens unit RL (RL1, RL2). In each sectional view, FLi represents an i-th (i is a natural number) lens unit counted from the object side included in the front lens unit FL. MLi represents an i-th (i is a natural number) lens unit counted from the object side included in the intermediate lens unit ML. RLi represents an i-th (i is a natural number) lens unit counted from the object side included in the rear lens unit RL.

The front lens unit FL corresponds to a first lens unit, and in the front lens unit FL, FL1 corresponds to a (1-1)-st sub optical system and FL2 corresponds to a (1-2)-nd sub optical system. In the intermediate lens unit ML, ML1 corresponds to a second lens unit, and ML2 corresponds to a third lens unit. The rear lens unit RL corresponds to a fourth lens unit, and in the rear lens unit RL, RL1 corresponds to a (4-1)-st sub optical system and RL2 corresponds to a (4-2)-nd sub optical system.

SP is an aperture stop (diaphragm). IP is an image plane, and when the optical system L0 according to each example is used as an image pickup optical system for a digital video camera or a digital still camera, an image pickup plane of a solid-state image sensor (photoelectric conversion element) such as a CCD sensor and a CMOS sensor is provided on the image plane IP. When the optical system L0 according to each example is used as an image pickup optical system for a film-based camera, a photosensitive plane of the film is disposed on the image plane IP.

In the optical system L0 according to each example, the positive first intermediate lens unit ML1 and the negative second intermediate lens unit ML2 move during focusing. Arrows shown in the respective sectional views represent moving directions of the first and second intermediate lens units ML and ML2 during focusing from infinity to the short distance end. The first and second intermediate lens units ML1 and ML2 move on different trajectories during focusing, and a distance between them changes. In the following description, the first and second intermediate lens units ML1 and ML2 that move during focusing will also be collectively referred to as a focus unit MLf.

FIGS. 2A, 2B, 4A, 4B, 6A, 6B, 8A, 8B, 10A, 10B, 12A and 12B are aberrational diagrams of the optical system L0 according to Examples 1, 2, 3, 4, 5, and 6, respectively. In each aberration diagram, FIGS. 2A, 4A, 6A, 8A, 10A, and 12A are aberration diagrams of the optical system L0 in the in-focus state on infinity, and FIGS. 2B, 4B, 6B, 8B, 10B, and 12 are aberration diagrams of the optical system L0 in the in-focus state on the short distance end.

In the spherical aberration diagram, Fno is the F-number, and the spherical aberration amounts for the d-line (wavelength 587.6 nm) and the g-line (wavelength 435.8 nm) are shown by the solid line and the alternate long and two short dashes line, respectively. In the astigmatism diagram, S indicates an astigmatism amount on a sagittal image plane (solid line), and M indicates an astigmatism amount on a meridional image plane (broken line). The distortion diagram illustrates a distortion amount for the d-line. The chromatic aberration diagram illustrates a chromatic aberration amount for the g-line. ω is a half angle of view (°).

Next follows a description of a characteristic configuration and conditions of the optical system L0 according to each example. The optical system L0 includes, in order from the object side to the image side, a front lens unit (first lens unit) FL fixed during focusing, a first intermediate lens unit (second lens unit) ML1 having a positive refractive power that moves during focusing, a second intermediate lens unit (third lens unit) ML2 having a negative refractive power that moves during focusing, and a rear lens unit (fourth lens unit) RL fixed during focusing. In the optical system L0, during focusing from infinity to the short distance end, the first intermediate lens unit ML1 and the second intermediate lens unit ML2 move to the object side while a distance between them changes. The optical system L0 satisfies the following conditional expression (1) where f1 is a focal length of the front lens unit FL, and f is a focal length of the entire optical system L0 in the in-focus state on infinity.

$$-0.4 < f/f1 < 0.8 \tag{1}$$

Fluctuations in astigmatism and curvature of field can be suppressed during focusing by moving both of the first intermediate lens unit ML1 having a positive refractive power and the second intermediate lens unit ML2 having a negative refractive power to the object side. The first intermediate lens unit ML1 having a positive refractive power and the second intermediate lens unit ML2 having a negative refractive power are arranged in order from the object side to the image side, and the first and second intermediate lens units ML1 and ML2 are moved so that the interval between them changes. Thereby, the fluctuations of the distortion and the lateral chromatic aberration can be suppressed. Then, if the first and second intermediate lens units ML1 and ML2 are moved so as to increase the distance between them, moving amounts of the first and second intermediate lens units ML1 and ML2 during focusing can be reduced.

The conditional expression (1) shows a condition regarding the focal length f1 of the front lens unit FL for suppressing the fluctuation of the spherical aberration and coma that may occur during focusing. By satisfying the conditional expression (1), the refractive power of the entire front lens unit FL can be made smaller, and the light ray incident on the first intermediate lens unit ML1 can be closer to afocal. Therefore, it is possible to suppress variations in spherical aberration and coma that may occur during focusing. When the focal length f1 of the front lens unit FL becomes smaller so that f/f1 exceeds the upper limit of the conditional expression (1), the positive refractive power of the front lens unit FL becomes stronger and it becomes difficult to sufficiently suppress the spherical aberration and coma. When the focal length f1 of the front lens unit FL increases so that f/f1 falls below the lower limit of the conditional expression (1), the negative refractive power of the front lens unit FL becomes stronger, and it becomes difficult to sufficiently suppress the spherical aberration and coma.

The numerical range of the conditional expression (1) may be set as in the following conditional expression (1a).

$$-0.2 < f/f1 < 0.5 \tag{1a}$$

The numerical range of the conditional expression (1) may be set as in the following conditional expression (1b).

$$-0.1 < f/f1 < 0.4 \tag{1b}$$

f/f1 may be larger than 0. This is because if f/f1 becomes smaller than the lower limit, the diameter of the light beam incident on the intermediate lens unit ML becomes larger and the lens diameter of the intermediate lens unit ML becomes larger.

By satisfying the conditional expression (1) in the above optical configuration, it is possible to satisfactorily suppress fluctuations in various aberrations during focusing with a smaller number of lenses in the focus unit ML or a reduced weight of the focus unit ML.

Next follows a description of a configuration that the optical system L0 according to each example may employ and the conditions that the optical system L0 may satisfy. The refractive powers of the lenses arranged from the object side to the image plane may be symmetrically arranged with respect to the aperture stop in order to correct various aberrations of the optical system. In particular, in a wide-angle lens in which a lens unit having a negative refractive power and closest to the object, a lens unit having a positive refractive power may be disposed between lens units having negative refractive powers.

Thus, even in each example, the front lens unit FL may include, in order from the object side to the image side, a first front lens unit ((1-1)-st sub optical system) FL1 has a negative refractive power, and a second front lens unit ((1-2)-nd sub optical system) FL2 having a positive refractive power, which are arranged with a maximum air gap in the front lens unit FL. The first intermediate lens unit ML1 having a positive refractive power may include a positive lens having a convex shape facing the object side and located closest to the object in the first intermediate lens unit ML1, and the second intermediate lens unit ML2 having a negative refractive power may include a negative lens having a concave shape facing the image side and located closest to the image in the second intermediate lens unit ML2. The rear lens unit RL may include, in order from the object side to the image side, a first rear lens unit ((4-1)-st sub optical system) RL1 having a positive refractive power which does not include a negative lens and disposed closest to the object in the rear lens unit RL, and a second rear lens unit ((4-2)-nd sub optical system) RL2 having a negative refractive power. The first rear lens unit may include all lenses in the rear lens unit RL on the object side of a negative lens closest to the object among negative lenses included in the rear lens unit RL. The second rear lens unit may include the negative lens closest to the object among the negative lenses included in the rear lens unit RL and all lenses of the rear lens unit RL closer to the image than it.

Each of the first intermediate lens unit ML1 and the second intermediate lens unit ML2, which are the focus unit MLf, may have three lenses or less. This configuration can reduce the weight of the focus unit MLf and the load on the actuator that drives the focus unit MLf. Therefore, focusing can be accelerated without using a high output actuator. If the number of lenses is four or more, the focus unit MLf becomes heavier.

Each of the first intermediate lens unit ML1 and the second intermediate lens unit ML2 in the focus unit MLf may include two lenses or less or a single lens.

On the other hand, as the number of lenses becomes smaller in order to reduce the weight of the focus unit MLf, the variation amounts of various aberrations during focusing become larger, which make difficult focusing on a short distance end. It is especially difficult for an optical system for a wide-angle lens with a large aperture diameter to reduce the aberrations caused by the marginal ray, and thus it becomes important to properly set the lens refractive power, the glass material, and the moving amounts during focusing, etc.

By disposing the lens of the focus unit MLf just after the aperture stop SP, the lens diameter of the focus unit MLf can be made smaller. Since h (the height from the optical axis) of the off-axis ray passing through the focus unit MLf can be reduced, the aberration variations of astigmatism and curvature of field can be restrained.

The optical system L0 according to each example may satisfy at least one of the following conditional expressions (2) to (11):

$$1.0 < m2/m3 < 3.0 \quad (2)$$

$$0.01 < f/f23 < 0.50 \quad (3)$$

$$0.3 < f/f2 < 1.4 \quad (4)$$

$$-1.4 < f/f3 < -0.3 \quad (5)$$

$$1.7 < nd2p < 2.1 \quad (6)$$

$$15 < vd3n < 45 \quad (7)$$

$$vd3n < vd2p \quad (8)$$

$$-3.0 < f11/f12 < -0.5 \quad (9)$$

$$0 < SK/f23 < 0.15 \quad (10)$$

$$0.3 < f/f4 < 1.0 \quad (11)$$

The conditional expression (2) shows a condition using the moving amount m2 of the first intermediate lens unit (second lens unit) ML1 and the moving amount m3 of the second intermediate lens unit (third lens unit) ML2 during focusing from infinity to the short distance end, to satisfactorily suppress the fluctuations of the distortion and the lateral chromatic aberration without increasing their moving amounts. When m2/m3 is lower than the lower limit of the conditional expression (2), the moving amount of the negative second intermediate lens unit ML2 relative to the positive first intermediate lens unit ML1 increases, thus the moving amount of the entire focus unit MLf increases, and the overall length of the optical system L0 increases. When m2/m3 is higher than the upper limit of the conditional expression (2), fluctuations of various aberrations cannot be satisfactorily suppressed during focusing to the short distance end due to the insufficient moving amount of the negative second intermediate lens unit ML2 relative to the positive first intermediate lens unit ML1.

The conditional expression (3) shows a condition using a combined focal length f23 of the first intermediate lens unit (second lens unit) ML1 and the second intermediate lens unit (third lens unit) ML2 which are the focus unit MLf in the in-focus state on infinity, and a focal length f of the entire optical system L0, to reduce the refractive power of the focus unit MLf and to satisfactorily suppress the variations of the spherical aberration during focusing. When f/f23 is lower than the lower limit of the conditional expression (3), the positive refractive power of the entire focus unit MLf becomes too small, the moving amount of the focus unit MLf during focusing increases, and consequently the overall length of system L0 becomes longer. If f/f23 is higher than the upper limit of the conditional expression (3), the positive refractive power of the entire focus unit MLf becomes larger, and it becomes difficult to suppress the fluctuations of the spherical aberration and coma during focusing.

The conditional expression (4) shows a condition using the focal length f of the entire optical system L0 and the focal length f2 of the first intermediate lens unit (second lens unit) ML1, to properly set the positive refractive power of the first intermediate lens unit ML1 and to satisfactorily suppress the fluctuation of the spherical aberration during focusing without increasing the moving amount of the focus unit MLf. When f/f2 is lower than the lower limit of the conditional expression (4), the positive refractive power of the entire focus unit MLf becomes smaller as the positive refractive power of the first intermediate lens unit ML1 decreases, and the moving amount of the unit MLf during focusing increases, and the overall length of the optical system L0 increases. When f/f2 is higher than the upper limit of the conditional expression (4), the positive refractive power of the entire focus unit MLf increases as the positive refractive power of the first intermediate lens unit ML1 increases, and it becomes difficult to suppress the variations of the spherical aberration and coma during focusing.

The conditional expression (5) shows a condition using the focal length f of the entire optical system L0 and the focal length f3 of the second intermediate lens unit (third lens unit) ML2, to properly set the negative refractive power of the second intermediate lens unit ML2 and to satisfactorily suppress the fluctuation of the spherical aberration during focusing without increasing the moving amount of the focus unit MLf. When f/f3 is lower than the lower limit of the conditional expression (5), the positive refractive power of the entire focus unit MLf becomes smaller as the negative refractive power of the second intermediate lens unit ML2 increases, the moving amount of the focus unit MLf increases during focusing increases, and the overall length of the optical system L0 increases. When f/f3 is higher than the upper limit of the conditional expression (5), the positive refractive power of the entire focus unit MLf increases as the negative refractive power of the second intermediate lens unit ML2 decreases, and it becomes difficult to suppress the variations of the spherical aberration and coma during focusing.

The conditional expression (6) shows a condition using a refractive index nd2p of a positive lens having the largest refractive index for the d-line among the refractive indexes of at least one positive lens included in the first intermediate lens unit (second lens unit) ML1, to increase the refractive power without increasing the curvature of that positive lens and to suppress the fluctuation of the spherical aberration during focusing. If nd2p is lower than the lower limit of the conditional expression (6), the curvature of the above positive lens becomes larger and it becomes difficult to suppress the variation of the spherical aberration during focusing. If nd2p is higher than the upper limit of the conditional expression (6), it is suitable for suppressing the fluctuation of the spherical aberration during focusing, but the Abbe number of the glass material becomes too small and the primary chromatic aberration correction becomes difficult.

The conditional expression (7) shows a condition using an Abbe number vd3n of a negative lens having the smallest Abbe number for the d-line among Abbe numbers of at least one negative lens included in the second intermediate lens unit (third lens unit) ML2, to suppress the variation of the longitudinal and lateral chromatic aberrations during focusing by performing the primary chromatic aberration correction. If vd3n is lower than the lower limit of the conditional expression (7), it is suitable for the primary chromatic aberration correction, but it becomes difficult to correct the secondary spectrum of the longitudinal and lateral chromatic aberrations. If vd3n is higher than the upper limit of the conditional expression (7), the primary chromatic aberration correction becomes insufficient, and it becomes difficult to suppress the fluctuations of the longitudinal and lateral chromatic aberrations during focusing.

The conditional expression (8) shows a condition using vd3n described above and an Abbe number vd2p for the d-line of a positive lens having the largest refractive index for the d-line among refractive indexes of at least one positive lens included in the first intermediate lens unit (second lens unit) ML1, to suppress the variation of the longitudinal and the lateral chromatic aberrations during focusing by performing the primary chromatic aberration correction in the focus unit MLf. If the conditional expression (8) is not satisfied, the primary chromatic aberration correction becomes insufficient, and it becomes difficult to suppress the variations of the longitudinal and lateral chromatic aberrations during focusing.

The conditional expression (9) shows a condition using the focal length f11 of the first front lens unit ((1-1)-st lens unit) FL1 and the focal length f12 of the second front lens unit (1-2nd lens unit) FL2, to reduce the refractive power of the entire front lens unit FL and to satisfactorily suppress the fluctuations of the spherical aberration and coma during focusing. If f11/f12 is lower than the lower limit of conditional expression (9), the positive refractive power of the front lens unit FL becomes too strong, and it becomes difficult to sufficiently suppress the spherical aberration and coma during focusing. If f11/f12 is higher than the upper limit of the conditional expression (9), the negative refractive power of the front lens unit FL becomes too strong, and it becomes difficult to sufficiently suppress the spherical aberration and coma during focusing.

The conditional expression (10) shows a condition using the combined focal length f23 of the first intermediate lens unit (second lens unit) ML1 and the second intermediate lens unit (third lens unit) ML2 and a backfocus SK of the optical system L0, to shorten the backfocus and the overall length of the optical system L0, and to weaken the refractive power of the focus unit MLf. When SK/f23 is lower than the lower limit of the conditional expression (10), the positive refractive power of the entire focus unit MLf becomes too small, the moving amount of the focus unit MLf during focusing increases, and the overall length of the optical system L0 increases. When SK/f23 is higher than the upper limit of the conditional expression (10), the backfocus increases, the overall length of the optical system L0 becomes longer, the refractive power of the focus unit MLf becomes stronger, and it becomes difficult to suppress the fluctuation of the spherical aberration during focusing.

The conditional expression (11) shows a condition using a focal length f4 of the rear lens unit (fourth lens unit) RL and the focal length f of the entire optical system L0, to reduce the size of the overall system, and to suppress the spherical aberration and coma aberration. If f/f4 is lower than the lower limit of the conditional expression (11), the share of the refractive power of the rear lens unit RL relative to the focal length f of the entire system becomes small, and it becomes difficult to achieve both the wide angle and the compact size. If f/f4 is higher than the upper limit of the conditional expression (11), the share of the refractive power of the rear lens unit RL relative to the focal length f of the overall system becomes large, and it becomes difficult to suppress the spherical aberration. The coma is likely to occur and the number of lenses in the rear lens unit RL is likely to increase.

The numerical ranges of the conditional expressions (2) to (7) and (9) to (11) may be set as in the following conditional expressions (2a) to (7a) and (9a) to (11a):

$$1.0 < m2/m3 < 2.0 \quad (2a)$$

$$0.01 < f/f23 < 0.46 \quad (3a)$$

$$0.40 < f/f2 < 1.35 \quad (4a)$$

$$-1.20 < f/f3 < -0.35 \quad (5a)$$

$$1.72 < nd2p < 2.10 \quad (6a)$$

$$15 < vd3n < 43 \quad (7a)$$

$$-2.70 < f11/f12 < -0.55 \quad (9a)$$

$$0.01 < SK/f23 < 0.15 \quad (10a)$$

$$0.3 < f/f4 < 0.8 \quad (11a)$$

The numerical ranges of the conditional expressions (2) to (7) and (9) to (11) may be set as in the following conditional expressions (2b) to (7b) and (9b) to (11b):

$$1.0 < m2/m3 < 1.6 \quad (2b)$$

$$0.01 < f/f23 < 0.43 \quad (3b)$$

$0.41 < f/f2 < 1.25$ (4b)

$-1.05 < f/f3 < -0.40$ (5b)

$1.74 < nd2p < 2.10$ (6b)

$15 < vd3n < 42$ (7b)

$-2.50 < f11/f12 < -0.59$ (9b)

$0.01 < SK/f23 < 0.13$ (10b)

$0.31 < f/f4 < 0.75$ (11b)

Numerical Examples 1 to 6 corresponding to Examples 1 to 6 will be shown below. In each numerical example, each surface in the optical system is provided with a surface number i (i is a natural number) counted from the object side. r represents a radius of curvature of each optical surface (mm), and d (mm) represents a lens thickness or distance (air gap) on an optical axis between a surface with a surface number i and a surface with a surface number (i+1), and nd represents a refractive index of a material for each optical element having each surface for the d-line. vd represents an Abbe number of the material for each optical element having each surface. The Abbe number vd of a certain material is represented as follows using refractive indexes Nd, NF, and NC for the d-line (587.6 nm), F-line (486.1 nm), and C-line (656.3 nm) of the Fraunhofer line.

$vd = (Nd-1)/(NF-NC)$

The focal length (mm), F-number, and half angle of view (°) are values when the optical system focuses on an object at infinity. An "overall lens length" is a length obtained by adding the backfocus SK to a distance on the optical axis from the frontmost surface (lens surface closest to the object) to the final surface (lens surface closest to the image) in the optical system. The "backfocus SK" is a distance on the optical axis from the final lens surface of the optical system to the image plane.

A symbol * added to the surface number means a surface having an aspherical surface. The aspherical shape is expressed as follows, where x is a displacement amount from the surface vertex in the optical axis direction, h is a height from the optical axis in the direction orthogonal to the optical axis, R is a paraxial radius of curvature, k is a conical constant, A4, A6, and A8 are aspherical coefficients:

$x = (h^2/R)/[1+\{1-(1+k)(h/R)^2\}^{1/2} + A4 \times h^4 + A6 \times h^6 + A8 \times h^8]$ Table 1 shows a relationship between each of the above conditional expressions (1) to (11) and the numerical examples 1 to 6.

Numerical Example 1

| | UNIT mm | | | |
|---|---|---|---|---|
| | Surface data | | | |
| Surface number | r | d | nd | vd |
| 1 | 59.322 | 2.43 | 2.00330 | 28.3 |
| 2 | 29.960 | 7.03 | | |
| 3 | 65.214 | 5.11 | 2.00330 | 28.3 |
| 4 | 57437.580 | 0.10 | | |
| 5 | 279.951 | 2.00 | 1.49700 | 81.5 |
| 6 | 21.819 | 13.69 | | |
| 7 | 104.640 | 3.30 | 2.00330 | 28.3 |
| 8 | −84.046 | 0.10 | | |
| 9 | −123.590 | 1.35 | 1.58913 | 61.1 |
| 10* | 49.294 | 5.40 | | |
| 11 | −28.050 | 1.35 | 1.53172 | 48.8 |
| 12 | 40.947 | 6.62 | 1.83481 | 42.7 |
| 13 | −40.305 | 4.26 | | |
| 14 | 311.122 | 1.35 | 1.96300 | 24.1 |
| 15 | 25.966 | 7.31 | 1.67790 | 55.3 |
| 16 | −66.718 | 0.50 | | |
| 17(diaphragm) | ∞ | d17 | | |
| 18 | 35.178 | 8.00 | 1.75500 | 52.3 |
| 19 | −111.684 | d19 | | |
| 20 | −296.741 | 1.35 | 1.69895 | 30.1 |
| 21 | 29.204 | d21 | | |
| 22 | 40.211 | 4.44 | 1.80518 | 25.4 |
| 23 | −172.747 | 0.10 | | |
| 24 | 86.897 | 3.16 | 1.43875 | 94.7 |
| 25 | −124.943 | 0.10 | | |
| 26 | 52.038 | 1.35 | 1.80810 | 22.8 |
| 27 | 26.285 | 0.81 | | |
| 28 | 31.167 | 2.88 | 1.43875 | 94.7 |
| 29 | 69.698 | 4.50 | | |
| 30* | −57.029 | 1.35 | 1.85400 | 40.4 |
| 31 | −231.103 | 15.00 | | |
| image plane | ∞ | | | |

UNIT mm

ASPHERIC DATA

10th surface

K = 0.00000e+000    A4 = 5.29359e−006    A6 = 7.98420e−009    A8 = −4.26039e−012

30th surface

K = 0.00000e+000    A4 = −1.86747e−005    A6 = −1.50666e−008    A8 = −4.55141e−011

VARIOUS DATA

| | |
|---|---|
| Focal length | 24.00 |
| F-number | 1.40 |
| Half angle of view | 42.03 |
| Image height | 21.64 |
| Overall lens length | 120.00 |
| SK | 15.00 |

| | ∞ | Short distance |
|---|---|---|
| Object distance | 1.00E+30 | 240 |
| d17 | 9.65 | 0.5 |
| d19 | 0.5 | 2.81 |
| d21 | 4.91 | 11.75 |

Numerical Example 2

UNIT mm

Surface data

| Surface number | r | d | nd | vd |
|---|---|---|---|---|
| 1 | 49.196 | 1.80 | 1.59522 | 67.7 |
| 2 | 22.598 | 6.79 | | |
| 3 | 36.936 | 7.00 | 1.71736 | 29.5 |
| 4 | −105.598 | 0.10 | | |
| 5 | −163.462 | 1.50 | 1.58913 | 61.1 |
| 6* | 41.804 | 10.04 | | |
| 7 | −25.042 | 1.20 | 1.74000 | 28.3 |
| 8 | 41.533 | 4.77 | 2.00100 | 29.1 |
| 9 | −37.002 | 0.10 | | |
| 10 | −2564.103 | 1.20 | 1.84666 | 23.8 |
| 11 | 25.094 | 5.41 | 1.60311 | 60.6 |
| 12 | −53.469 | 1.63 | | |
| 13(diaphragm) | ∞ | d13 | | |
| 14 | 35.224 | 8.00 | 1.77250 | 49.6 |
| 15 | −156.614 | d15 | | |
| 16 | −181.956 | 4.62 | 1.58144 | 40.8 |
| 17 | 26.518 | d17 | | |
| 18 | 43.683 | 4.34 | 2.00100 | 29.1 |
| 19 | −96.021 | 0.10 | | |
| 20 | 100.263 | 1.20 | 1.78472 | 25.7 |
| 21 | 31.346 | 0.49 | | |
| 22 | 35.404 | 3.55 | 1.43875 | 94.7 |
| 23 | 424.174 | 6.23 | | |
| 24* | −42.973 | 1.50 | 1.85400 | 40.4 |
| 25 | −231.103 | 15.00 | | |
| image plane | ∞ | | | |

ASPHERIC DATA

6th surface

K = 0.00000e+000    A4 = 4.06320e−006    A6 = 5.92880e−009    A8 = 2.10954e−011

24th surface

K = 0.00000e+000    A4 = −1.10703e−005    A6 = −6.10583e−009    A8 = −8.72890e−012

VARIOUS DATA

| | |
|---|---|
| Focal length | 35.00 |
| F-number | 1.80 |

-continued

| UNIT mm | |
|---|---|
| Half angle of view | 31.72 |
| Image height | 21.64 |
| Overall lens length | 100.00 |
| SK | 15.00 |

| | ∞ | Short distance |
|---|---|---|
| Object distance | 1.00E+30 | 350 |
| d13 | 10.73 | 0.5 |
| d15 | 0.50 | 2.88 |
| d17 | 2.18 | 10.03 |

Numerical Example 3

| UNIT mm | | | | |
|---|---|---|---|---|
| Surface data | | | | |
| Surface number | r | d | nd | vd |
| 1 | 50.059 | 1.50 | 1.83481 | 42.7 |
| 2 | 18.734 | 6.57 | | |
| 3 | 143.570 | 3.72 | 1.80518 | 25.4 |
| 4 | −51.393 | 0.10 | | |
| 5 | −56.075 | 1.35 | 1.58913 | 61.1 |
| 6* | 65.386 | 11.39 | | |
| 7 | 180.217 | 6.16 | 1.75500 | 52.3 |
| 8 | −19.511 | 1.20 | 1.51742 | 52.4 |
| 9 | −162.370 | 2.31 | | |
| 10 | 40.195 | 1.20 | 1.84666 | 23.8 |
| 11 | 19.211 | 3.91 | 1.51823 | 58.9 |
| 12 | 53.641 | 1.89 | | |
| 13(diaphragm) | ∞ | d13 | | |
| 14 | 28.338 | 4.96 | 1.83481 | 42.7 |
| 15 | −100.526 | d15 | | |
| 16 | −174.847 | 2.22 | 1.75500 | 52.3 |
| 17 | −46.525 | 0.33 | | |
| 18 | −40.822 | 1.20 | 1.68893 | 31.1 |
| 19 | 22.046 | d19 | | |
| 20 | 42.300 | 4.16 | 1.84666 | 23.8 |
| 21 | −83.103 | 0.10 | | |
| 22 | 36.525 | 1.20 | 2.00100 | 29.1 |
| 23 | 21.480 | 0.10 | | |
| 24 | 20.944 | 7.54 | 1.43875 | 94.7 |
| 25 | −42.909 | 0.10 | | |
| 26 | −409.522 | 1.20 | 1.84666 | 23.8 |
| 27 | 110.006 | 4.93 | | |
| 28* | −26.949 | 1.20 | 1.85400 | 40.4 |
| 29 | −83.777 | 15.85 | | |
| image plane | ∞ | | | |

ASPHERIC DATA

6th surface

K = 0.00000e+000   A4 = 8.71643e−006   A6 = 4.80876e−009   A8 = 5.73527e−011

28th surface

K = 0.00000e+000   A4 = −1.76678e−005   A6 = −1.00929e−008   A = −7.53781e−011

| VARIOUS DATA | |
|---|---|
| Focal length | 28.00 |
| F-number | 1.80 |
| Half angle of view | 37.69 |
| Image height | 21.64 |
| Overall lens length | 100.00 |
| SK | 15.85 |

| | ∞ | Short distance |
|---|---|---|
| Object distance | 1.00E+30 | 280 |
| d13 | 8.26 | 0.50 |

-continued

| UNIT mm | | |
|---|---|---|
| d15 | 0.50 | 2.26 |
| d19 | 4.85 | 10.85 |

Numerical Example 4

| UNIT mm | | | | |
|---|---|---|---|---|
| Surface data | | | | |
| Surface number | r | d | nd | vd |
| 1 | 42.958 | 1.50 | 1.88300 | 40.8 |
| 2 | 22.723 | 5.76 | | |
| 3 | 52.959 | 1.50 | 1.49700 | 81.5 |
| 4 | 19.543 | 14.68 | | |
| 5 | 48.716 | 4.57 | 2.00330 | 28.3 |
| 6 | −69.781 | 0.10 | | |
| 7 | −146.982 | 1.50 | 1.58913 | 61.1 |
| 8* | 46.911 | 7.11 | | |
| 9 | −29.095 | 1.50 | 1.75520 | 27.5 |
| 10 | 32.057 | 6.86 | 1.88300 | 40.8 |
| 11 | −29.489 | 0.57 | | |
| 12 | 58.814 | 1.50 | 1.83400 | 37.2 |
| 13 | 18.364 | 5.50 | 1.51633 | 64.1 |
| 14 | −450.458 | 0.50 | | |
| 15(diaphragm) | ∞ | d15 | | |
| 16 | 33.339 | 1.80 | 1.75500 | 52.3 |
| 17 | 54.878 | 0.10 | | |
| 18 | 29.277 | 7.18 | 1.49700 | 81.5 |
| 19 | −241.601 | d19 | | |
| 20 | 67.831 | 1.50 | 1.90525 | 35.0 |
| 21 | 21.669 | d21 | | |
| 22 | 34.537 | 6.51 | 1.80000 | 29.8 |
| 23 | −40.870 | 0.15 | | |
| 24 | −77.991 | 1.50 | 1.80810 | 22.8 |
| 25 | 52.950 | 0.42 | | |
| 26 | 64.506 | 2.14 | 1.43875 | 94.7 |
| 27 | 299.876 | 3.79 | | |
| 28* | −69.528 | 1.50 | 1.85400 | 40.4 |
| 29 | −231.103 | 15.06 | | |
| image plane | ∞ | | | |

| ASPHERIC DATA |
|---|
| 8th surface |
| K = 0.00000e+000   A4 = 6.49747e−006   A6 = 1.22446e−008   A8 = 6.29862e−011 |
| 28th surface |
| K = 0.00000e+000   A4 = −2.21865e−005   A6 = −3.07822e−008   A8 = −1.01299e−011 |

| VARIOUS DATA | |
|---|---|
| Focal length | 24.00 |
| F-number | 1.80 |
| Half angle of view | 42.03 |
| Image height | 21.64 |
| Overall lens length | 110.00 |
| SK | 15.06 |

| | ∞ | Short distance |
|---|---|---|
| Object distance | 1.00E+30 | 200 |
| d15 | 9.72 | 0.5 |
| d19 | 0.50 | 2.76 |
| d21 | 4.99 | 11.94 |

Numerical Example 5

| UNIT mm | | | | |
|---|---|---|---|---|
| Surface data | | | | |
| Surface number | r | d | nd | vd |
| 1 | 49.651 | 2.30 | 1.95375 | 32.3 |
| 2 | 28.911 | 5.86 | | |
| 3 | 51.892 | 2.00 | 1.49700 | 81.5 |
| 4 | 25.028 | 19.73 | | |
| 5 | 75.177 | 3.82 | 1.96300 | 24.1 |
| 6 | −158.590 | 4.99 | | |
| 7 | 129.634 | 1.35 | 1.58913 | 61.1 |
| 8* | 38.445 | 7.53 | | |
| 9 | −24.233 | 1.35 | 1.54814 | 45.8 |
| 10 | 10583.932 | 5.31 | 1.81600 | 46.6 |
| 11 | −30.697 | 0.57 | | |
| 12 | 280.770 | 1.35 | 1.96300 | 24.1 |
| 13 | 35.893 | 7.05 | 1.75500 | 52.3 |
| 14 | −56.869 | 0.50 | | |
| 15 (diaphragm) | ∞ | d15 | | |
| 16 | 54.234 | 2.08 | 2.00100 | 29.1 |
| 17 | 120.611 | 0.10 | | |
| 18 | 45.879 | 1.83 | 1.88300 | 40.8 |
| 19 | 74.468 | d19 | | |
| 20 | −216.115 | 1.35 | 1.84666 | 23.8 |
| 21 | 47.915 | 1.89 | | |
| 22 | 64.453 | 3.87 | 1.75500 | 52.3 |
| 23 | −49.060 | 0.10 | | |
| 24 | 1270.290 | 1.35 | 1.84666 | 23.8 |
| 25 | 34.484 | d25 | | |
| 26 | 35.823 | 5.16 | 1.95906 | 17.5 |
| 27 | −76.181 | 0.10 | | |
| 28 | −138.490 | 1.35 | 1.92286 | 18.9 |
| 29 | 31.557 | 0.10 | | |
| 30 | 31.557 | 2.99 | 1.43875 | 94.7 |
| 31 | 83.354 | 2.92 | | |
| 32* | −1220.372 | 1.35 | 1.58913 | 61.1 |
| 33 | 5062.602 | 15.79 | | |
| image plane | ∞ | | | |

ASPHERIC DATA

8th surface

K = 0.00000e+000  A4 = 5.94965e−006  A6 = 5.83946e−009  A8 = −8.69553e−012

32th surface

K = 0.00000e+000  A4 = −2.63191e−005  A6 = −2.56780e−008  A8 = −6.41782e−011

VARIOUS DATA

| | | |
|---|---|---|
| Focal length | | 24.00 |
| F-number | | 1.40 |
| Half angle of view | | 42.03 |
| Image height | | 21.64 |
| Overall lens length | | 120.00 |
| SK | | 15.79 |

| | ∞ | Short distance |
|---|---|---|
| Object distance | 1.00E+30 | 240 |
| d15 | 8.23 | 0.5 |
| d19 | 2.16 | 4.79 |
| d25 | 3.55 | 8.64 |

Numerical Example 6

| UNIT mm | | | | |
|---|---|---|---|---|
| Surface data | | | | |
| Surface number | r | d | nd | vd |
| 1 | 106.560 | 4.53 | 1.75500 | 52.3 |
| 2 | −225.743 | 0.10 | | |
| 3 | 30.955 | 2.38 | 1.67790 | 55.3 |
| 4 | 41.189 | 4.95 | | |
| 5 | −121.772 | 1.50 | 1.51823 | 58.9 |
| 6 | 27.548 | 7.31 | | |
| 7 | 160.771 | 4.53 | 1.75500 | 52.3 |
| 8 | −68.623 | 6.00 | 1.84666 | 23.8 |
| 9 | −252.189 | 2.62 | | |
| 10(diaphragm) | ∞ | d10 | | |
| 11 | 35.434 | 7.00 | 1.77250 | 49.6 |
| 12 | −66.567 | 0.10 | | |
| 13 | −68.155 | 1.50 | 1.64769 | 33.8 |
| 14 | 3718.036 | d14 | | |
| 15* | 186.923 | 1.50 | 1.68948 | 31.0 |
| 16* | 31.230 | d16 | | |
| 17 | 121.724 | 3.41 | 1.75500 | 52.3 |
| 18 | −85.408 | 0.10 | | |
| 19 | −853.599 | 3.21 | 1.75500 | 52.3 |
| 20 | −54.587 | 0.85 | | |
| 21 | −42.096 | 1.50 | 1.71736 | 29.5 |
| 22 | 48.833 | 0.10 | | |
| 23 | 43.743 | 7.37 | 2.00100 | 29.1 |
| 24 | −88.293 | 5.26 | | |
| 25* | −51.517 | 1.50 | 1.85400 | 40.4 |
| 26 | 159.386 | 15.00 | | |
| image plane | ∞ | | | |

ASPHERIC DATA

15th surface

K = 0.00000e+000   A4 = 3.93140e−006   A6 = 4.39296e−009   A8 = −1.78632e−011

16th surface

K = 0.00000e+000   A4 = 5.04966e−006   A6 = 9.16696e−009   A8 = 3.89126e−013

25th surface

K = 0.00000e+000   A4 = −3.16243e−006   A6 = 4.88097e−039   A8 = −6.61340e−012
A10 = 1.58273e−014

VARIOUS DATA

| | | |
|---|---|---|
| Focal length | | 50.00 |
| F-number | | 1.40 |
| Half angle of view | | 23.40 |
| Image height | | 21.64 |
| Overall lens length | | 100.00 |
| SK | | 15.00 |

| | ∞ | Short distance |
|---|---|---|
| Object distance | 1.00E+30 | 500 |
| d10 | 13.23 | 0.5 |
| d14 | 0.50 | 3.84 |
| d16 | 3.94 | 13.32 |

TABLE 1

| Conditional Expression | EXAMPLE 1 | EXAMPLE 2 | EXAMPLE 3 | EXAMPLE 4 | EXAMPLE 5 | EXAMPLE 6 |
|---|---|---|---|---|---|---|
| f | 24 | 35 | 28 | 24 | 24 | 50 |
| f1 | 168.641 | 225.785 | −346.153 | 96.043 | 51.658 | 359.595 |
| f11 | −45.656 | −236.337 | −39.207 | −28.349 | −41.761 | −331.633 |
| f12 | 61.741 | 133.846 | 65.529 | 41.798 | 46.108 | 150.233 |
| f23 | 213.180 | 179.188 | 137.662 | 201.577 | 519.141 | 120.324 |

TABLE 1-continued

| Conditional Expression | EXAMPLE 1 | EXAMPLE 2 | EXAMPLE 3 | EXAMPLE 4 | EXAMPLE 5 | EXAMPLE 6 |
|---|---|---|---|---|---|---|
| f2 | 35.283 | 37.914 | 26.953 | 36.328 | 55.887 | 41.827 |
| f3 | −37.974 | −39.484 | −27.542 | −35.724 | −54.641 | −54.594 |
| f4 | 51.203 | 59.648 | 48.221 | 60.963 | 74.598 | 75.329 |
| SK | 15.000 | 15.000 | 15.850 | 15.060 | 15.790 | 15.000 |
| m2 | −9.15 | −10.23 | −7.76 | −9.22 | −7.73 | −12.73 |
| m3 | −6.84 | −7.85 | −6 | −6.95 | −5.09 | −9.38 |
| nd2p | 1.755 | 1.773 | 1.835 | 1.755 | 2.001 | 1.773 |
| vd2p | 52.3 | 49.6 | 42.7 | 52.3 | 29.1 | 49.6 |
| vd3n | 30.1 | 40.8 | 31.1 | 35 | 23.8 | 31 |
| (1) −0.4 < f/f1 < 0.8 | 0.142 | 0.155 | −0.061 | 0.250 | 0.465 | 0.139 |
| (2) 1.0 < m2/m3 < 3.0 | 1.338 | 1.303 | 1.293 | 1.327 | 1.519 | 1.357 |
| (3) 0.01 < f/f23 < 0.50 | 0.113 | 0.195 | 0.203 | 0.119 | 0.046 | 0.416 |
| (4) 0.3 < f/f2 < 1.4 | 0.68 | 0.92 | 1.04 | 0.66 | 0.43 | 1.20 |
| (5) −1.4 < f/f3 < −0.3 | −0.63 | −0.89 | −1.02 | −0.67 | −0.44 | −0.92 |
| (6) 1.7 < nd2p < 2.1 | 1.755 | 1.773 | 1.835 | 1.755 | 2.001 | 1.773 |
| (7) 1.5 < vd3n < 45 | 30.1 | 40.8 | 31.1 | 35.0 | 23.8 | 31.0 |
| (9) −3.0 < f11/f12 < −0.5 | −0.739 | −1.781 | −0.598 | −0.678 | −0.906 | −2.207 |
| (10) 0 < SK/f23 < 0.15 | 0.070 | 0.084 | 0.115 | 0.075 | 0.030 | 0.125 |
| (11) 0.3 < f/f4 < 1.0 | 0.469 | 0.587 | 0.581 | 0.394 | 0.322 | 0.664 |

Figure 13:
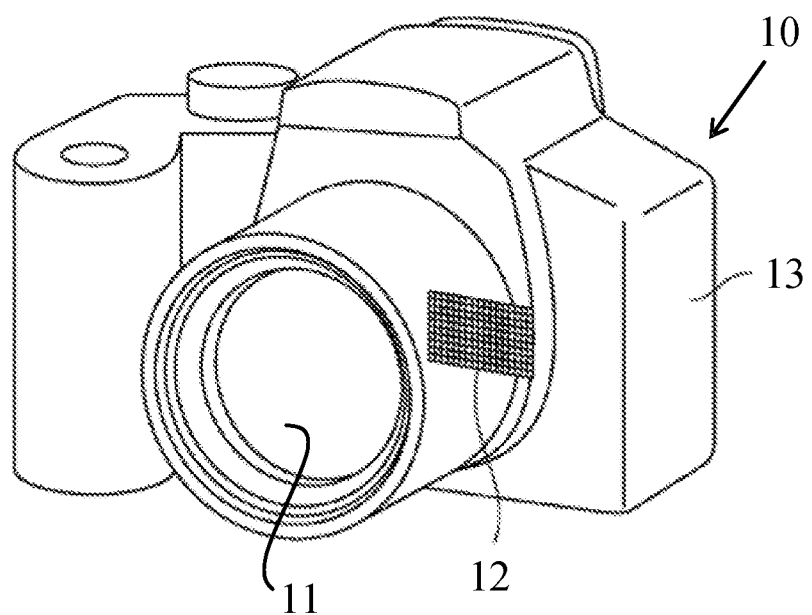
FIG. 13 illustrates an image pickup apparatus according to Example 7 of the present invention.

FIG. 13 illustrates a digital still camera (image pickup apparatus, optical apparatus) according to Example 7 using the optical system L0 of any of Examples 1 to 6 for an image pickup optical system. Reference numeral 10 denotes a camera body, and reference numeral 11 denotes the image pickup optical system. Reference numeral 12 denotes a solid-state image sensor (photoelectric conversion element) such as a CCD sensor or a CMOS sensor included in the camera body 10 and receives an optical image formed by the image pickup optical system 11 and photoelectrically converts it.

The camera body 10 may be a single-lens reflex camera having a quick return mirror or a mirrorless camera having no quick return mirror.

Use of the optical system L0 of any one of Examples 1 to 6 for an image pickup apparatus such as a digital still camera can provide an image pickup apparatus having a compact lens. If the optical system L0 according to any of Examples 1 to 6 is mounted on an interchangeable lens (optical apparatus), a compact interchangeable lens can be obtained.

The above example can provide an optical system that can suppress the aberrational variations during focusing with the lightweight second and third lens units as the focus unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132360, filed on Jul. 18, 2019 which is hereby incorporated by reference herein in its entirety.

What is claimed is:

1. An optical system comprising, in order from an object side to an image side:
a first lens unit that remains fixed during focusing;
a second lens unit having a positive refractive power and configured to move during focusing;
a third lens unit having a negative refractive power and configured to move during focusing; and
a fourth lens unit that remains fixed during focusing,
wherein during focusing from infinity to a short distance end, the second lens unit and the third lens unit move to the object side while a distance between the second lens unit and the third lens unit changes, and
wherein the following condition is satisfied:

$$-0.4 < f/f1 < 0.8,$$

where f1 is a focal length of the first lens unit, and f is a focal length of the optical system focused on the infinity.

2. The optical system according to claim 1, wherein each of the second lens unit and the third lens unit consists of three lenses or less.

3. The optical system according to claim 1, wherein the distance between the second lens unit and the third lens unit increases during focusing from the infinity to the short distance end.

4. The optical system according to claim 1, wherein the following condition is satisfied:

$$1.0 < m2/m3 < 3.0,$$

where m2 is a moving amount of the second lens unit and m3 is a moving amount of the third lens unit during focusing from the infinity to the short distance end.

5. The optical system according to claim 1, wherein the following condition is satisfied:

$$0.01 < f/f23 < 0.50,$$

where f23 is a combined focal length of the second lens unit and the third lens unit when the optical system is focused on the infinity.

6. The optical system according to claim 1, wherein the following condition is satisfied:

$$0.3 < f/f2 < 1.4,$$

where f2 is a focal length of the second lens unit.

7. The optical system according to claim 1, wherein the following condition is satisfied:

$$-1.4 < f/f3 < -0.3,$$

where f3 is a focal length of the third lens unit.

8. The optical system according to claim 1, wherein the following condition is satisfied:

$$1.7 nd2p < 2.1,$$

where nd2p is a refractive index of a positive lens having the largest refractive index for d-line among refractive indexes of at least one positive lens included in the second lens unit.

9. The optical system according to claim 1, wherein the following condition is satisfied:

$$15 < vd3 < 45,$$

where vd3 is an Abbe number of the negative lens having the smallest Abbe number for d-line among Abbe numbers of at least one negative lens included in the third lens unit.

10. The optical system according to claim 9, wherein the following condition is satisfied:

$$vd3n < vd2p,$$

where vd2p is an Abbe number for the d-line of the positive lens having the largest refractive index for the d-line among refractive indexes of at least one positive lens included in the second lens unit.

11. The optical system according to claim 1, wherein:
the first lens unit consists of, in order from the object side to the image side, a (1-1)-st sub optical system having a negative refractive power, and a (1-2)-nd sub optical system having a positive refractive power, which are arranged with a maximum air gap in the first lens unit, and
the following condition is satisfied:

$$-3.0 < f11/f12 < -0.5,$$

where f11 is a focal length of the (1-1)-st sub lens unit, and f12 is a focal length of the (1-2)-nd sub optical system.

12. The optical system according to claim 1, further comprising an aperture stop provided between the first lens unit and the second lens unit.

13. The optical system according to claim 1, wherein the following condition is satisfied:

$$0 < SK/f23 < 0.15,$$

where f23 is a combined focal length of the second lens unit and the third lens unit when the optical system is focused on the infinity, and SK is a backfocus of the optical system.

14. The optical system according to claim 1, wherein the second lens unit includes a positive lens that is located closest to an object in the second lens unit and has a convex surface facing the object side.

15. The optical system according to claim 1, wherein the third lens unit includes a negative lens that is located closest to an image in the third lens unit and has a concave shape facing the image side.

16. The optical system according to claim 1, wherein the following condition is satisfied:

$$0.3 < f/f4 < 1.0,$$

where f4 is a focal length of the fourth lens unit.

17. The optical system according to claim 1, wherein the fourth lens unit consists of, in order from the object side to the image side, a (4-1)-st sub optical system having a positive refractive power and located closest to an object in the fourth lens unit and does not include a negative lens, and a (4-2)-nd sub optical system having a negative refractive power and includes the negative lens.

18. An optical apparatus comprising:
an optical system comprising, in order from an object side to an image side:
  a first lens unit that remains fixed during focusing;
  a second lens unit having a positive refractive power and configured to move during focusing;
  a third lens unit having a negative refractive power and configured to move during focusing; and
  a fourth lens unit that remain fixed during focusing,
  wherein during focusing from infinity to a short distance end, the second lens unit and the third lens unit move to the object side while a distance between the second lens unit and the third lens unit changes, and
  wherein the following condition is satisfied:

$$-0.4 < f/f1 < 0.8,$$

where f1 is a focal length of the first lens unit, and f is a focal length of the optical system focused on the infinity.

19. The optical apparatus according to claim 18, further comprising an image sensor configured to photoelectrically convert an optical image formed by the optical system.

20. The optical system according to claim 1, wherein:
in a state where the optical system is focused on the infinity, the second lens unit is located closer to the image side than a position of the second lens unit in a state where the optical system is focused on the short distance end, and
in the state where the optical system is focused on the infinity, the third lens unit is located closed to the image side than a position of the third lens unit in the state where the optical system is focused on the short distance end.

* * * * *